A. HEDBAVNY.

Assignor to L. WERNER.

MACHINE FOR REMOVING WATER HAIRS FROM PELTS.

No. 11,079. Reissued May 27, 1890.

Witnesses
Ira R. Steward
Fredric Carragan

Inventor
Anton Hedbavny
by Ernst Otto,
his Attorney

UNITED STATES PATENT OFFICE.

ANTON HEDBAVNY, OF NEW YORK, N. Y., ASSIGNOR TO LOUIS WERNER, OF SAME PLACE.

MACHINE FOR REMOVING WATER-HAIRS FROM PELTS.

SPECIFICATION forming part of Reissued Letters Patent No. 11,079, dated May 27, 1890.

Original No. 408,879, dated August 13, 1889. Application for reissue filed March 6, 1890. Serial No. 342,917.

*To all whom it may concern:*

Be it known that I, ANTON HEDBAVNY, of the city, county, and State of New York, a citizen of the United States, have invented certain new and useful Improvements in Machines for Removing Water-Hairs from Pelts, of which the following is a specification.

This invention relates to an improved machine for removing the stiff water-hairs from pelts by the action of a metallic conductor that is heated to incandescence by an electric current from a dynamo or other source of electricity; and the invention consists of a machine for removing the water-hairs from pelts, comprising a knife-edged bar, means for intermittently feeding the pelt over said knife-edged bar, a serrated guard-comb at one side of said bar, a rotary brush at the other side of the same, said brush serving to comb the wool in downward direction away from the water-hair, and an incandescent metallic conductor, which is supported on oscillating levers that are intermittently actuated by suitable cam mechanism, said metallic conductor being connected to a suitable source of electricity.

Figure 1:
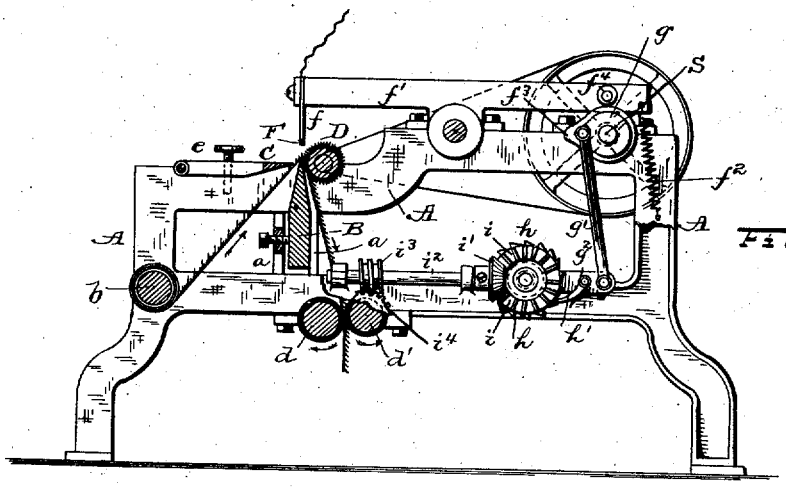
Figure 2:
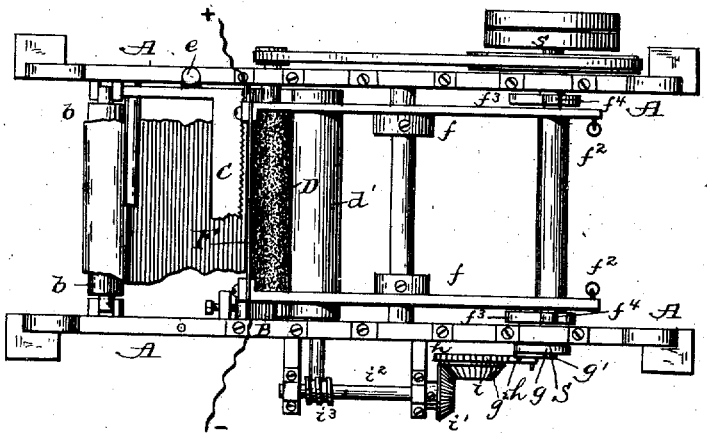

In the accompanying drawings, Figure 1 represents a side elevation, partly in vertical longitudinal section, of my improved machine for removing water-hairs from pelts; and Fig. 2 is a top view of the same with some of the parts broken away.

Similar letters of reference indicate corresponding parts.

Referring to the drawings, A represents the supporting-frame of my improved machine for removing water-hairs from pelts. The frame A supports in suitable guides a vertically-adjustable knife-edged bar B, over which the pelts to be treated are stretched. The pelts are preferably basted onto a suitable apron of canvas or other suitable fabric and wound on a roller *b*, from which the pelt is passed over the edge of the bar B and then in downward direction between two feed-rolls *d d'*, which serve to move the pelt intermittently over the edge of the transverse bar B. At one side of the knife-edged bar is arranged a pivoted guard plate or comb C, having a serrated edge, which is adjusted higher or lower, according to the position of the knife-edged bar B, by means of set-screws *e*.

The guard-comb C serves to retain the soft hair or wool of the pelt before the same passes over the edge of the transverse bar B. The guard-comb C, however, does not retain the stiff water-hairs, but permits them to straighten up immediately as they pass the serrated edge of the blade, so as to project vertically in line with the axis of the transverse bar B, or nearly so, in upward direction. At the opposite side of the knife-edged bar B is arranged a rotary brush D, which is preferably a solid bristle brush, as shown in the drawings, but may be made of longitudinal serrated rubber strips, said brush being rotated at considerable speed in bearings of the supporting-frame by a belt-and-pulley transmission from the driving-shaft S.

The quick brushing action exerted by the roller D on the pelt at the opposite side of the knife-edged bar combs the wool on that side in downward direction, so that the water-hairs project upward and can be burned off by a metallic conducting rod or bar E, which is supported transversely above the edge of the bar B on arms *f*, attached to oscillating levers *f'*, which latter are fulcrumed to the supporting-frame A and are connected at their rear ends by suitable springs $f^2$ with the frame A.

The metallic conductor F is connected with the poles of a dynamo or other source of electricity and kept by the current from the same in an incandescent state. The levers *f'* receive an intermittent oscillating motion by cams $f^3$, that engage anti-friction rollers $f^4$ at the rear ends of the levers *f'*, so that said incandescent conductor is intermittently lowered and applied to the stiff projecting water-hairs of the pelt, so as to burn the same, without, however, injuring the fine hairs or wool which are retained at one side of the bar B by the guard-comb C and at the other side by the rotary brush D. The cam $f^2$ at one side of the driving-shaft S is provided with an additional crank-disk *g*, which is connected by a pivot-link *g'* with an arm $g^2$, that is pivoted to the shaft of a ratchet-wheel $h$, which is engaged by a spring-actuated pawl $h'$, pivoted to the arm $g^2$, so as to be turned for a distance of one or more teeth at each rotation of the crank-disk $g$ on the driving-shaft S. To the shaft of the ratchet-wheel is further keyed a bevel-wheel $i$, which meshes with a pinion $i'$ on a short longitudinal shaft $i^2$, that turns in bearings on the frame A, and is provided with a worm $i^3$, that engages with a worm-wheel $i^4$ at the end of the shaft of the feed-roller $d'$, so as to move intermittently at each rotation of the driving-shaft S. The feed-rolls $d$ $d'$ press tightly on the apron and pelts attached, so as to feed the same intermittently forward over the knife-edged bar. During the time when the pelt is at rest the incandescent conductor is lowered, so as to burn off the projecting water-hairs. As soon as the burning off of the water-hairs is accomplished on the narrow strip of pelt above the edge of the bar the incandescent conductor is removed away from the pelt and the pelt fed forward by its intermittently-operated feed mechanism, so as to bring the adjoining strip of pelt over the edge of the bar B, the hairs of which are burned off by the incandescent conductor, and so on.

At each rotation of the driving-shaft a narrow strip of pelt is thus fed over the knife-edged bar and a new set of water-hairs burned off by the action of the incandescent conductor F, so that finally, when the entire pelt has been moved over the knife-edged bar, all the projecting water-hairs of the same are burned off without injury to the fine hairs or wool of the same. The pelt is then removed from the machine, rubbed with hot sand, and then carefully washed with water, so that the burned hair and the smell of the same are removed, after which the pelts are ready for dyeing and for use. During the operation of removing the water-hairs the brush may be shielded or protected in some way, so that it will not be burned by the incandescent conductor.

What I claim as my invention, and desire to secure by Letters Patent, is—

1. In a machine for removing the stiff water-hairs from pelts, a metallic conductor heated to incandescence by an electric current, and means to bring said incandescent conductor in contact with the water-hairs to remove the same, substantially as described.

2. In a machine for removing the stiff water-hairs from pelts, the combination of an incandescent conductor intermittently moved to and from a knife-edged bar, over which the pelt is stretched, with a rotary brush for brushing the fur away from said bar and leaving the stiff water-hairs standing thereon for removal by said conductor, substantially as described.

3. The combination of a transverse knife-edged bar, means for intermittently feeding the pelt over said knife-edged bar, a guard-comb at one side of said knife-edged bar, a rotary brush at the opposite side of the same, and an intermittently-oscillating incandescent conductor located above the knife-edged bar, so as to burn off the projecting water-hairs when it is brought in contact therewith, substantially as set forth.

4. The combination of a transverse knife-edged bar, intermittently-actuated feed-rolls for moving the pelt over the edge of said bar, an adjustable guard-comb having a serrated edge at one side of said bar, a rotary brush at the other side of same, an incandescent conductor, fulcrumed levers supporting said conductor, and mechanism for oscillating said levers and conductor, so as to cause it to approach to or recede from the edge of the pelt above the bar, substantially as set forth.

In witness whereof I have hereunto signed my name, in the presence of two witnesses, this 3d day of March, A. D. 1890.

ANTON HEDBAVNY.

Witnesses:
ERNEST C. WEBB,
EDMOND C. BROWN.